H. A. W. WOOD.
STEREOTYPE PRINTING PLATE CASTING APPARATUS.
APPLICATION FILED JULY 11, 1905. RENEWED JULY 13, 1910.
1,009,272.
Patented Nov. 21, 1911.
7 SHEETS—SHEET 1.
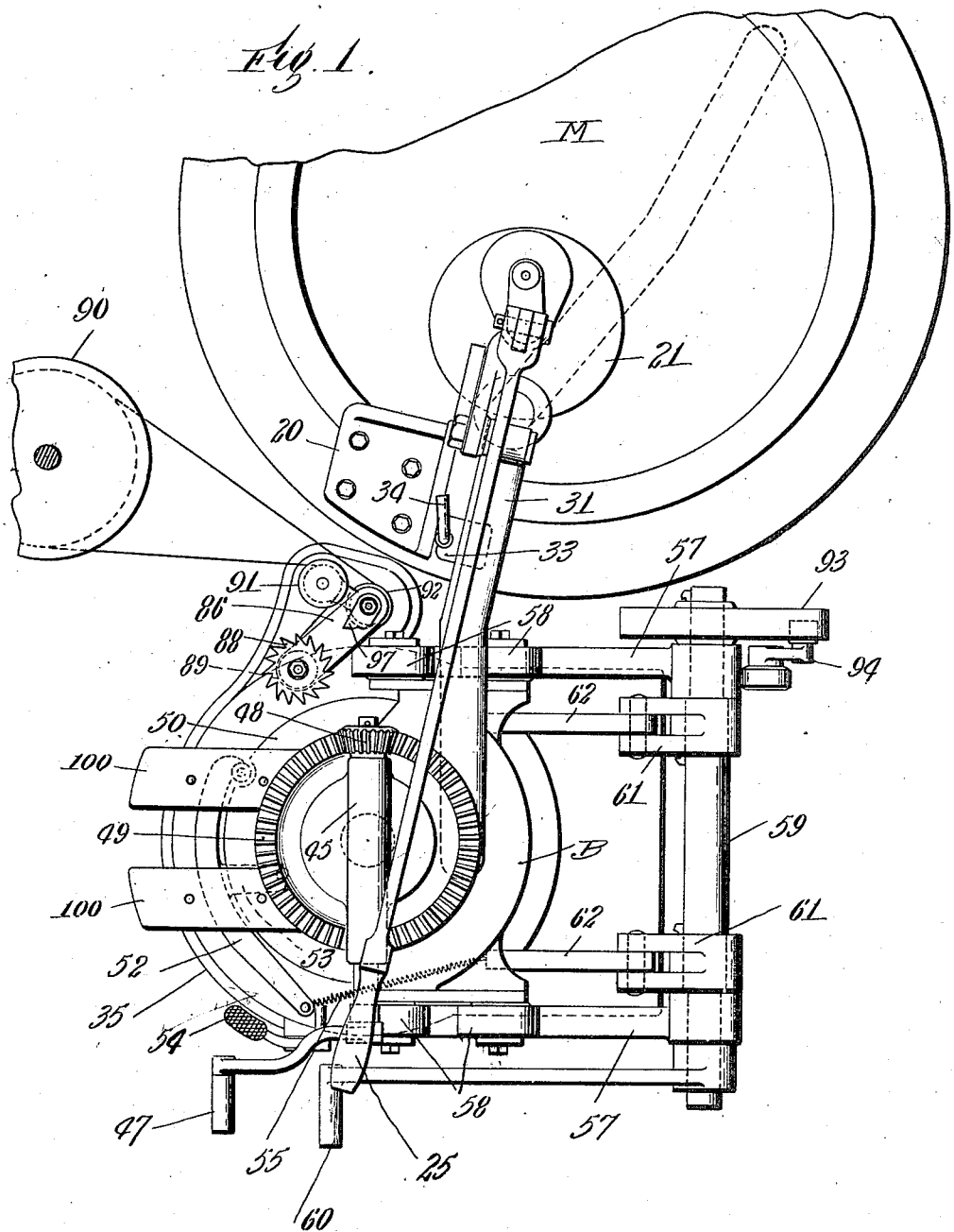

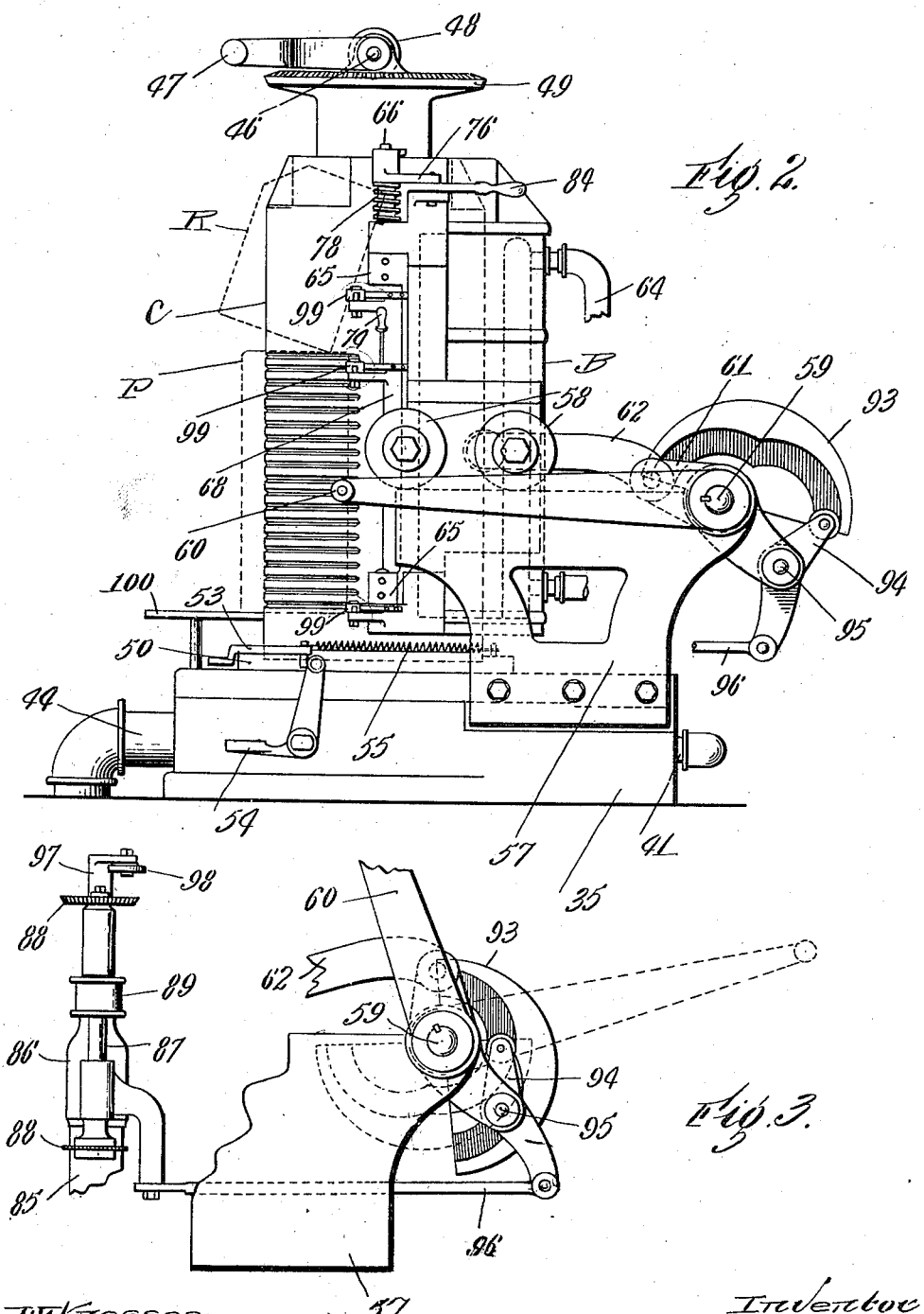

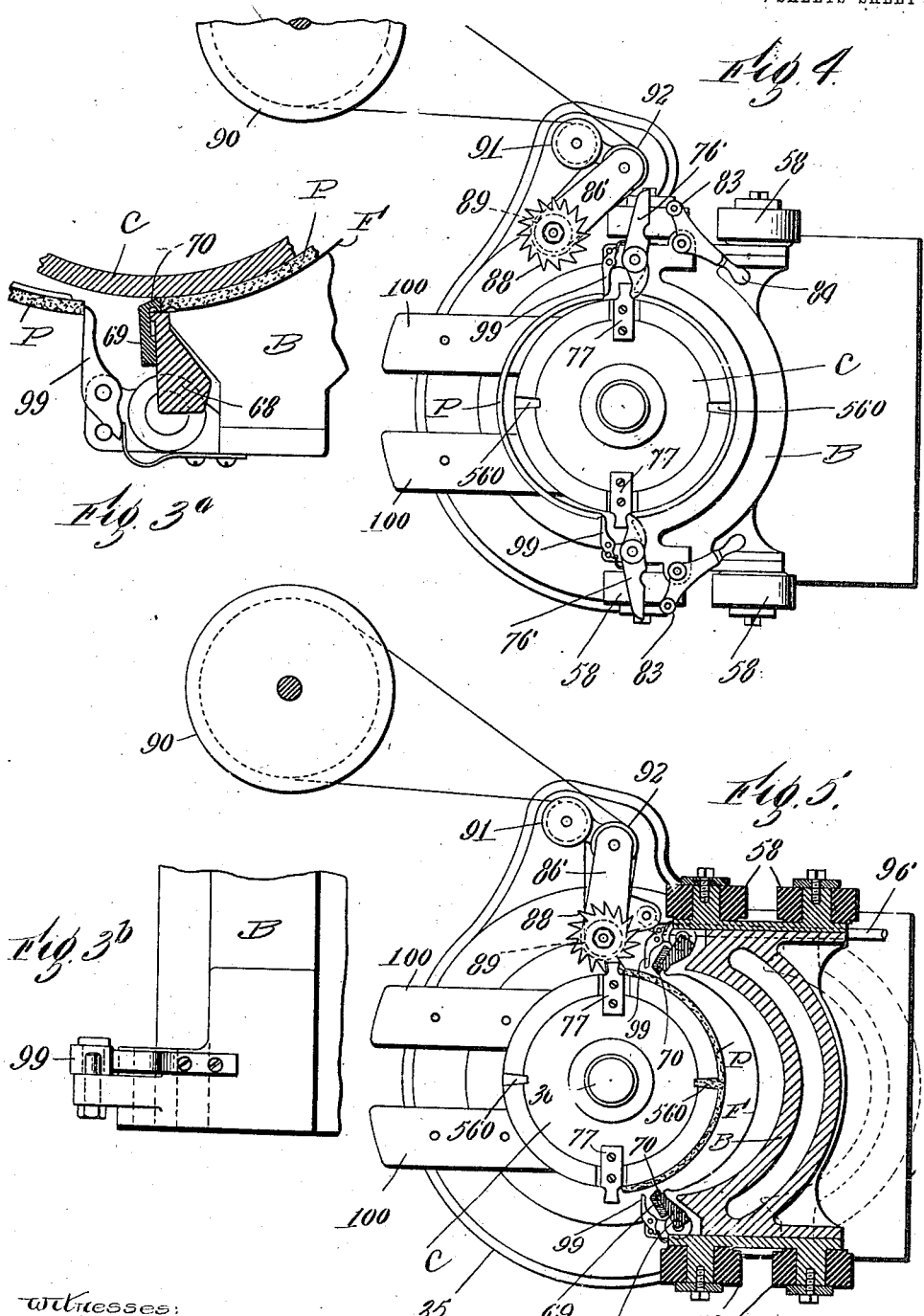

H. A. W. WOOD.
STEREOTYPE PRINTING PLATE CASTING APPARATUS.
APPLICATION FILED JULY 11, 1905. RENEWED JULY 13, 1910.
1,009,272.
Patented Nov. 21, 1911.
7 SHEETS—SHEET 4.
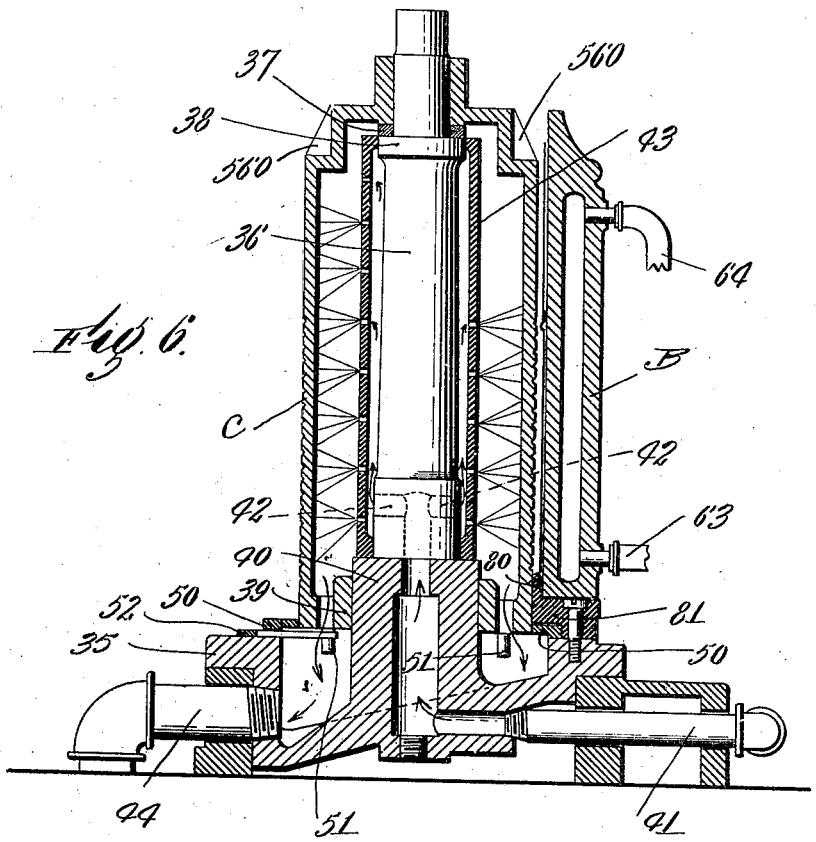
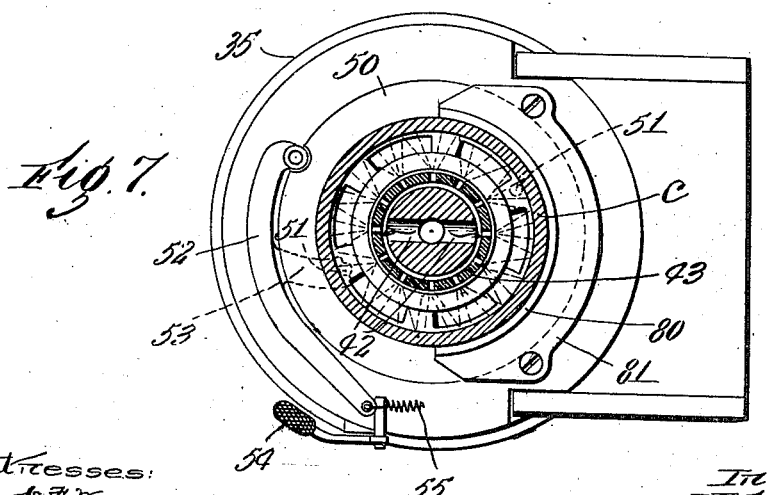

H. A. W. WOOD.
STEREOTYPE PRINTING PLATE CASTING APPARATUS.
APPLICATION FILED JULY 11, 1905. RENEWED JULY 13, 1910.
1,009,272.
Patented Nov. 21, 1911.
7 SHEETS—SHEET 5.
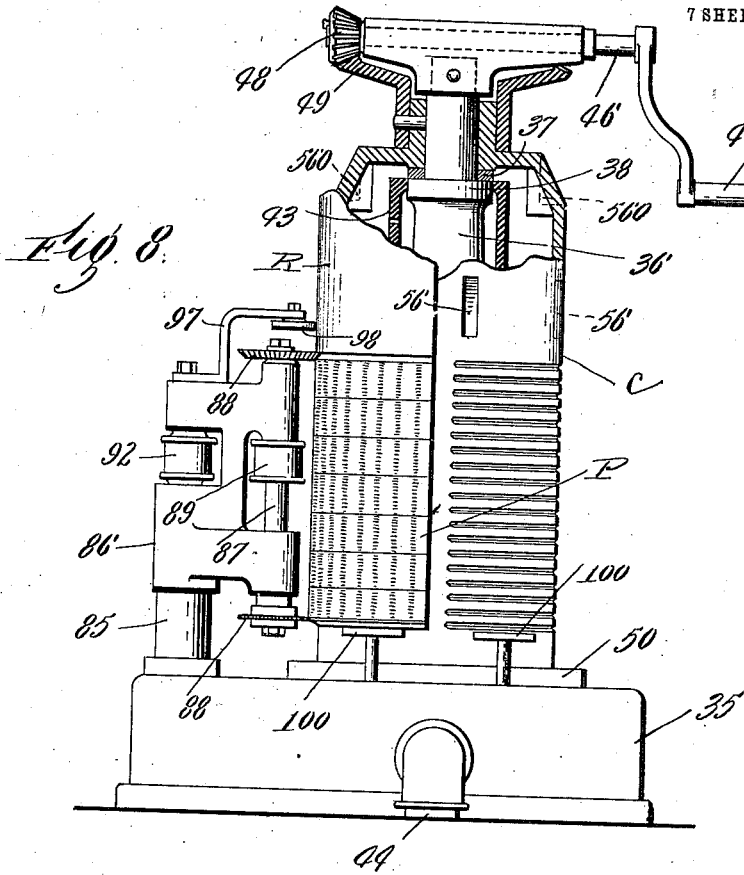
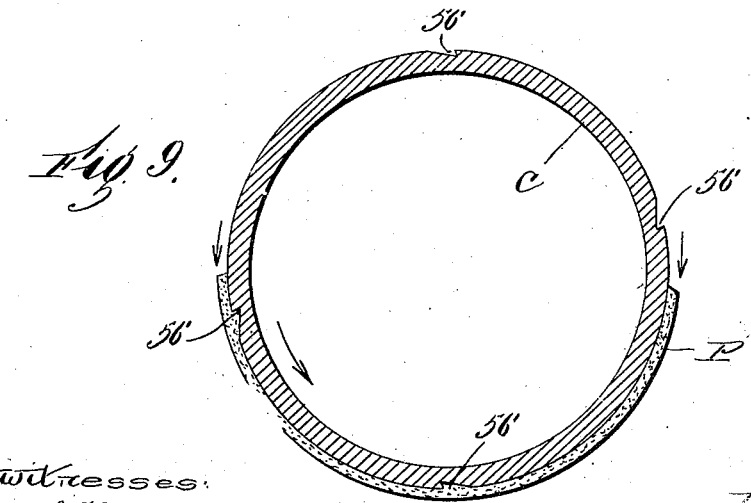

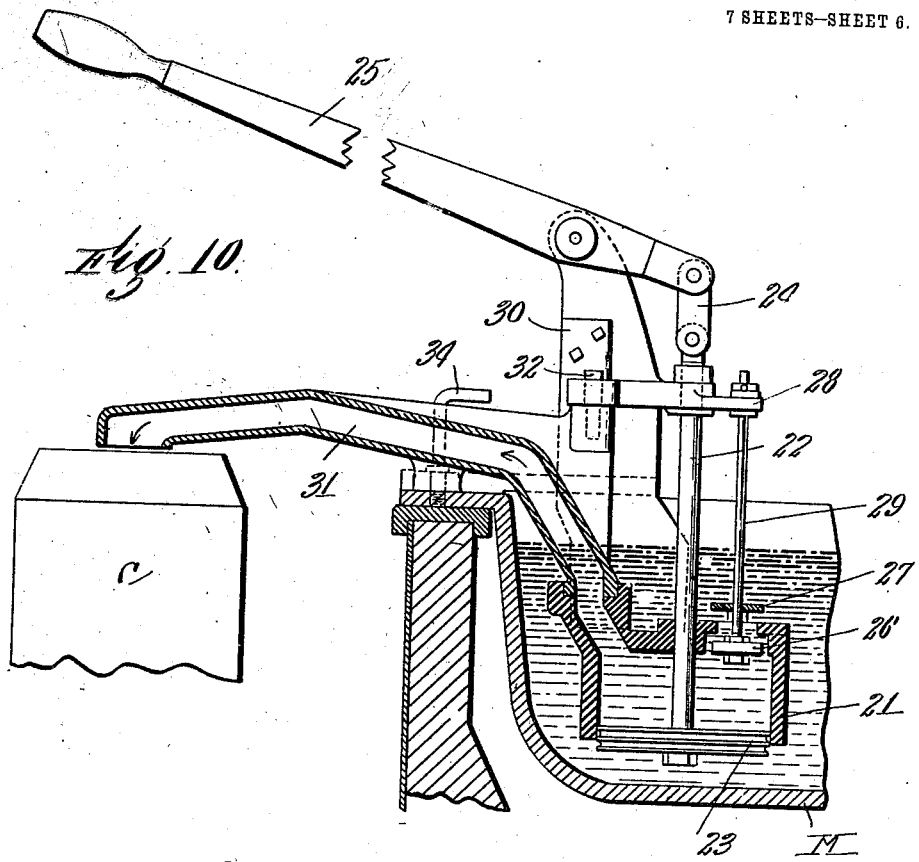
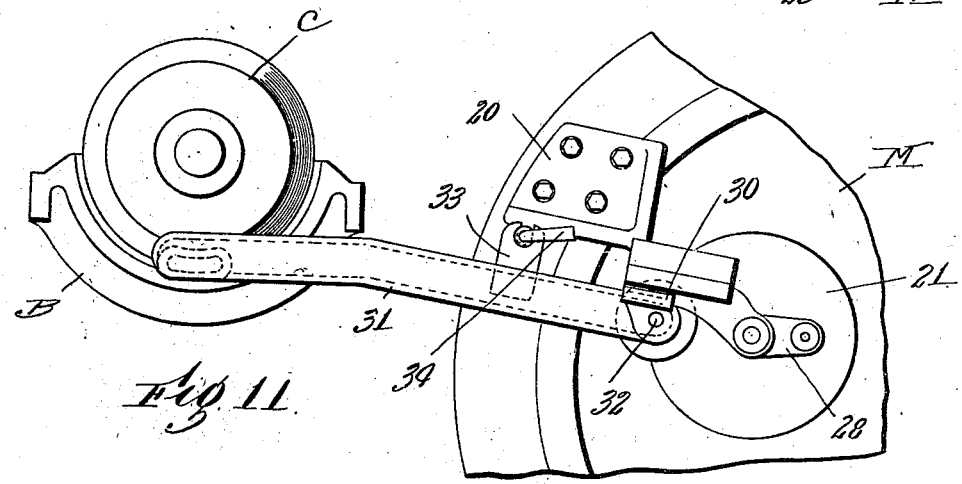

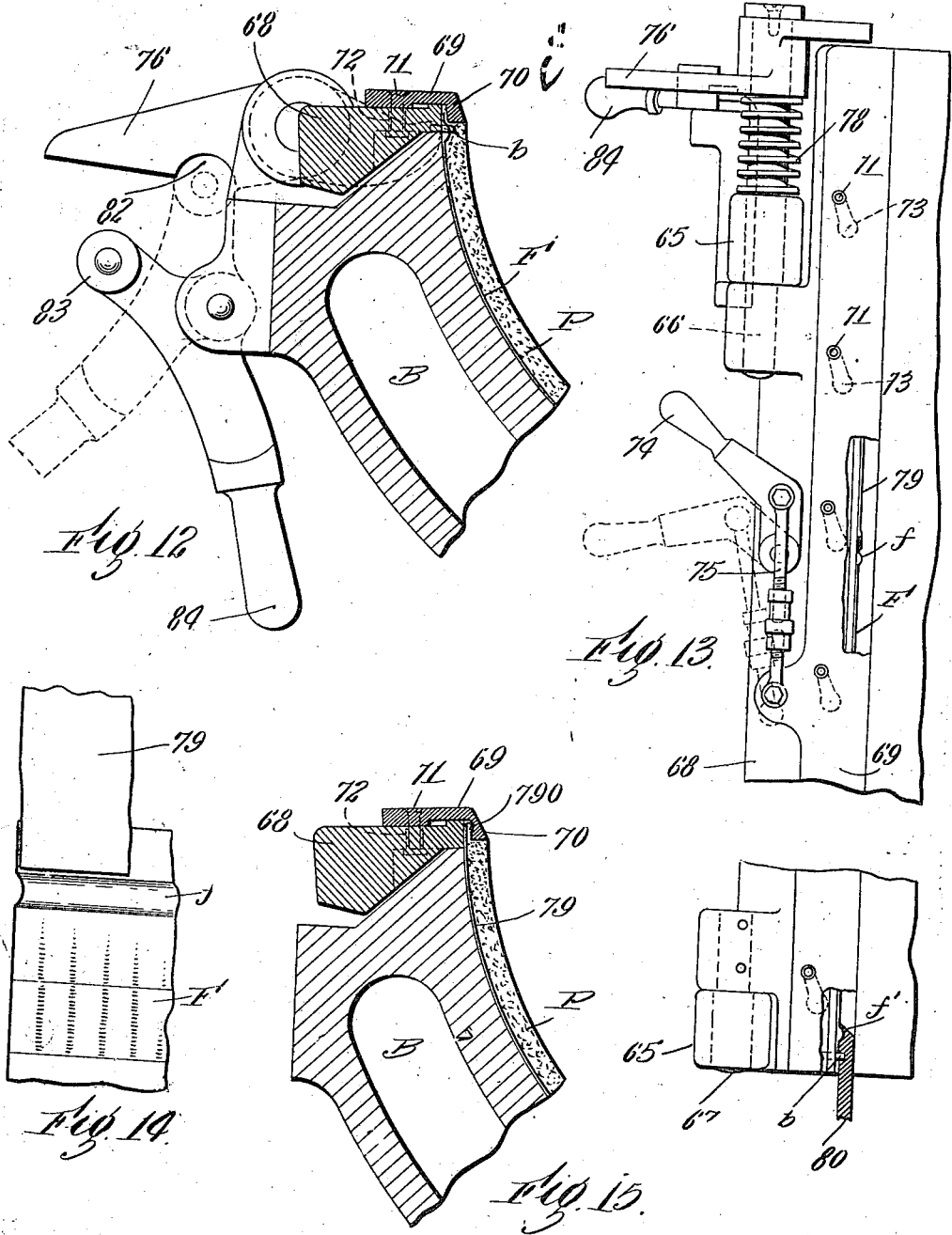

UNITED STATES PATENT OFFICE.

HENRY A. WISE WOOD, OF NEW YORK, N. Y., ASSIGNOR, BY MESNE ASSIGNMENTS, TO AUTOPLATE COMPANY OF AMERICA, OF JERSEY CITY, NEW JERSEY, A CORPORATION OF NEW JERSEY.

STEREOTYPE-PRINTING-PLATE-CASTING APPARATUS.

1,009,272. Specification of Letters Patent. Patented Nov. 21, 1911.

Original application filed December 5, 1904, Serial No. 235,535. Divided and this application filed July 11, 1905, Serial No. 269,267. Renewed July 13, 1910. Serial No. 571,847.

*To all whom it may concern:*

Be it known that I, HENRY A. WISE WOOD, a citizen of the United States, residing at New York, in the county of New York and State of New York, have invented a new and useful Stereotype-Printing-Plate-Casting Apparatus, of which the following is a specification.

This application for patent is a division of an application for patent filed by me December 5, 1904, Serial No. 235,535 except a slight change in a part which is detailed in Figures 3ª and 3ᵇ hereinafter referred to.

The object of this invention is to provide a new and improved apparatus for casting curved stereotype printing plates in an expeditious and economical way.

By the improvements hereinafter described a mechanism is provided so that all the manipulations and operations can be done with very little exertion by the operator or operators, and a large product obtained.

The apparatus can be clearly understood from the accompanying drawings which illustrate the best manner now known to me for putting the invention into practice.

Referring to the drawings and in detail, Fig. 1 is a plan view of the apparatus. Fig. 2 is a front elevation of the casting mechanism. Fig. 3 is a detail view of the mechanism which brings the trimmers hereinafter referred to into and out of operative position. Figs. 3ª and 3ᵇ are detail views showing the pusher fingers hereinafter described which are more fully detailed than in said original case. Fig. 4 is a plan view of the casting box closed. Fig. 5 is a sectional plan view with the box opened, illustrating the way the matrix is manipulated. Fig. 6 is a sectional elevation illustrating the construction of the casting-box. Fig. 7 is a sectional plan view illustrating the construction of the base and the ring which closes the lower part of the casting chamber. Fig. 8 is a side elevation of the casting mechanism. Fig. 9 is a horizontal section through the core or cylinder illustrating the way the plate is held thereto. Fig. 10 is a sectional elevation, and Fig. 11 a plan of the pumping mechanism for pouring the mold or casting chamber. Fig. 12 is a sectional plan view on an enlarged scale illustrating the matrix manipulating mechanism. Fig. 13 is a front elevation of one edge of the box illustrating the matrix manipulating mechanism, and Figs. 14 and 15 are an elevation and a sectional plan view illustrating the shield which is used to guide the metal into the casting chamber.

Briefly describing the mechanism, it will be seen that the same consists of a casting-box arranged in upright or vertical position adjacent to a melting-pot, and a pump arranged in the melting-pot so that the molten metal can be lifted from the melting-pot into the casting apparatus.

The casting apparatus consists of a cylindrical core arranged in a vertical position, and a segmental back which is arranged to slide horizontally relatively to the cylinder or core. Secured to the vertical edges of the back is a matrix manipulating mechanism which holds and carries the flexible matrix from which the cast plates are to be made. This mechanism is so arranged that when the segmental back is moved up to operative position next to the cylinder or core, the matrix is brought to proper casting shape and position in the casting chamber, and so that when the back is moved away from the cylinder or core to open the box, the matrix is flexed and separated from the convex type surface of the cast plate.

The casting chamber is made considerably deeper than the length of the plate desired so that the cast will have a "riser" formed thereon, whereby the metal which is to form the plate will be forced tightly into the interstices of the matrix to form a perfect cast.

A trimming mechanism is provided and is so arranged that when the back is moved to open the casting chamber the same will be brought into operative position. After the back is opened the cylinder or core is given a half revolution. This will move the plate past said finishing mechanism which will cut off the riser and trim the lower edge of the plate. As the back is then closed for the next cast, the trimmed plate is forced off of the outer periphery of the core and thereafter is removed by the operator. Thus the operation of casting and trimming a plate can be expeditiously performed by a single operator.

In the particular machine illustrated and described for the purpose of clearly setting out my invention the only application of power that is made is to drive the trimmers.

The detail parts of this invention are arranged as follows: M designates the melting-pot which is arranged over a fire or burners in the usual way so that a large quantity of stereotype metal can be brought therein to molten condition. Bolted to the edge of the melting-pot is a bracket 20 which carries, or which has formed therewith, a pump cylinder 21. Fitting in this cylinder 21, and in a guide is a piston rod 22 which carries a piston 23 at its lower end. The piston rod connects by link 24 to a pivoted operating handle 25. An induction valve 26 is arranged to coöperate with a valve-seat formed in the upper part of the cylinder 21, which valve is guided by a muffle-plate 27 and a guide 28 in which the rod 29 which carries said valve is guided. A pivoted outlet spout 31 is held in position so that it can revolve by means of a pin 32 fitted in an arm of bracket 30. The spout has a slotted ear 33 projecting therefrom which can fit under a collar formed on a handle 34, the lower end of which is screw-threaded into the melting-pot. By this construction the spout 31 can be held in adjusted position so as to come properly over the casting apparatus, or by releasing the handle 34 it can be swung around so as to discharge into the melting-pot as indicated in Fig. 1. This latter adjustment of the spout permits the operator to operate the pump to throw a quantity of molten metal through the spout to clean the same out or drive out any chilled metal therein before using the pump for the casting operation, thus insuring a full supply of clean molten metal when the pump is to be used to fill the mold or casting apparatus.

Referring now to the details of the casting apparatus, the same consists, in the first place, of a base piece 35, fitted into which is a cylindrical upright 36. The cylinder or core C is journaled on this upright. The upper end of the cylinder is closed and is formed with a hub which engages a bearing collar 37 supported on a shoulder 38 formed on the upright 36. The lower end of the cylinder C is provided with a head 39 which is fitted on a hub 40 formed at the lower part of the upright 36. The lower outer wall of the upright 36 is made inclined as shown, and is also cored or bored out so that a water supply pipe 41 can be attached thereto to direct water up into the upright. Outlet holes 42 are provided part way up in the upright. The upright is surrounded between the shoulder 38 and the hub 40 with a perforated cylinder 43. By this arrangement, the water coming in through the supply pipe will be forced out through these perforations against the inner periphery of the cylinder or core C. The perforations in the cylinder 43 are arranged as shown in Fig. 6, so that the right-hand part of the jets will only engage that part of the periphery of the cylinder which is opposed to the flexible matrix, while the left hand part of said jets will engage substantially one-half of the inner periphery of the cylinder. By this arrangement the surface of the cylinder on which the riser is cast will be kept hot so that the metal will freely pass down into that portion of the casting chamber in which the plate is to be cast; while when the cylinder is rotated this portion thereof will be cooled as the plate comes around out of the casting chamber.

The head 39 of the cylinder is perforated as shown so that the water used for cooling the cylinder can run down through the same onto the inclined lower wall of the upright and pass out through a waste pipe 44. On the top of the upright is secured a bracket 45 in which is journaled a short shaft 46 having a handle 47 secured to one end thereof, and a bevel pinion 48 secured to the other end thereof. This bevel pinion engages a large bevel gear 49 secured to the upper hub of the cylinder C, as shown in Fig. 8. By this arrangement the cylinder C can be turned upon the upright 36. A ring 50 is secured to the base-piece, and is fitted closely to the lower end of the cylinder or core so as to form substantially a water-tight joint. The lower head 39 of the cylinder is provided with two locking pins 51—51 for holding the cylinder in its different operative positions. A pivoted lever 52 is provided with a notched arm 53 which passes through and fits tightly in the ring so as to engage one and then the other of said locking pins and hold the cylinder or core C in its two positions. This pivoted lever 52 is operated from a pivoted treadle 54 and is kept in normal position by a spring 55. When the operator desires to turn the core, he places his foot upon the piece 54, releasing the notched arm 53 from the particular pin 51 with which it is in engagement, and then turns the handle 47 until the core or cylinder C is given a half turn, when the other pin 51 will engage the notched arm 53 and lock the cylinder or core in its new position. The cylinder or core C is provided with four notches or undercut places 56, and two diametrically opposite recesses 560 for purposes hereinafter pointed out. The places 56 come in behind that portion of the cast which constitutes the riser R. These notches or places 56 are pointed, as shown in Fig. 9, so that the plate cannot move circumferentially on the core or cylinder.

Referring now to the details of the back and matrix manipulating mechanism, it will be seen that two brackets 57—57 are bolted to the base-piece 35. The tops of these brackets are finished to form ways. The segmental back B is provided with two rollers or wheels 58—58 on each side to run on these ways, so that said back can move horizontally relatively to the cylinder. A shaft 59 is journaled in said brackets 57, and has an operating handle 60 secured to its outer end. Also secured to said shaft are pronged levers 61—61 which connect by links 62 to the back B, and form a toggle lock to hold the back in closed position. The segmental back B is made hollow and suitable flexible inlet and outlet pipes 63—64 connect thereto so that water can be circulated through the back to keep the same cool during casting.

The segmental back carries the matrix manipulating mechanism. The mechanism at each straight edge of the box is substantially the same, and consists of the following parts:—Lugs 65—65 project from each edge of the back. Secured in the upper lug is a shaft 66, and secured in the lower lug is a short shaft 67, which shafts 66 and 67 come in line with each other. The matrix holder 68 is pivoted on these shafts. Fitted on top of each matrix holder is a sliding piece 69 which has a jaw 70 which overhangs the edge of the matrix to form a clamp. The piece 69 has a number of studs 71 projecting down therefrom which carry rollers 72 which fit in cam-slots 73 cut in the matrix holder, whereby when the piece 69 is moved up and down on the matrix holder, the jaw 70 will be moved to close and open the clamp.

To operate the clamps an angular lever 74 is pivoted to each matrix holder and is connected by an adjustable link 75 to the sliding piece 69. This link is so disposed relatively to the pivot of the lever 74 as to form a toggle lock, so that when said handle is raised, as shown in Fig. 13, the clamp will be closed and locked, and so that when the lever 74 is depressed as shown in dotted lines in said Fig. 13, the clamp will be opened.

A two-arm lever 76 is secured to the top of each shaft 66, and as the particular matrix holder 68 is also secured to said shaft 66 said lever will control the moving of said matrix holder around the shafts 66 and 67.

Stops or actuating pieces 77 are secured to the top of the cylinder or core C in position to engage the inner arms of the levers 76, whereby when the back is moved up to the core or cylinder to close the casting chamber, that is the annular space between the segmental back and the core, the matrix holders will be swung to position the flexible matrix F accurately in the casting chamber for the cast. Torsion springs 78 are arranged between the upper lugs 65 and each of said two-arm levers 76, so as normally to throw the matrix holders out around their pivots when the back is retracted from the core or cylinder, this action resulting in a flexing of the matrix, and the stripping of the same from the straight edges of the plate, so that the continued movement of the back away from the core will separate the matrix from the surface of the cast plate.

To prevent metal from getting in between the matrix and the segmental back, a semi-cylindrical piece or shield of flexible sheet metal 79 is secured in the sliding pieces 69—69, as shown in Fig. 15, by means of beads or rims 790. The rings 790 are large enough to keep the shield 79 in the clamps, no matter whether they are opened or closed, and the clamps are so arranged that the shield can be slid up and down therein, both when the clamps are opened and closed. Secured to the base-piece 35 is a semi-cylindrical half-ring 80 which has a projecting flange 81 which extends up into the space between the segmental back and the core to close the lower end of the casting chamber. This flange 81 is slightly cut away or shaped as shown in Fig. 13, to engage the lower end of the flexible matrix F. It will be seen that when the box is closed, the sliding pieces 69—69 close the straight edges of the casting chamber.

The projecting arms of the two-armed levers 76—76 are provided with notches 82 which can be engaged by rolls 83 secured on the ends of the levers 84 which are pivoted to the back.

In making the flexible matrix F the same is provided with an upper and lower bolster f—f'.

The way the matrix is inserted in position is as follows:—The segmental back is moved away from the cylinder or core to open the box, by throwing the handle 60 to the dotted position shown in Fig. 3; the levers 74 are moved to the dotted position shown in Fig. 13, to open the clamps; the shield 79 is raised in the clamps; the levers 84 are operated to throw the matrix clamps into the position which they assume during the casting of a plate; the flexible matrix is put in place and is adjusted in position with its lower end engaging pins b in the matrix holders 68, which fit into holes in the flange 81 when the chamber is closed; the flexible matrix F is now finally smoothed out and accurately adjusted for its final position, the levers 74 are then moved to the position shown in full lines in Fig. 13, whereby the edges of the matrix are tightly engaged by the matrix clamps; and the shield 79 is now slid down in the clamps to engage the upper bolster f of the matrix, as shown in Fig. 14. The levers 84 are now released and the matrix is thereby secured in operative position to the box. The matrix will now be properly manipulated as the box is closed and opened for successive duplicate casts. The flexible piece 79 will not interfere with the action as the same will practically follow the flexing of the matrix, but said shield will prevent metal getting between the matrix and the back when the cast is poured. When the back is moved up close to the core, or the casting box is closed, the lower curved edge of the matrix will be tightly pinched between the angular flange 81 and the segmental back, as shown in Figs. 6 and 13.

To separate the riser from the cast plate and to trim the lower curved edge of the cast plate, the following mechanism is provided:—A post 85 is secured to the base 35, and pivoted to turn on the same is a two-armed bracket 86 in which is journaled a shaft 87 which has cutters 88—88 secured to its upper and lower ends. A pulley 89 is mounted on the shaft 87.

90 designates a suitable pulley which is driven from any source of power. A belt is led from the same around a guide pulley 92 journaled concentrically with the swinging bracket 86, around the pulley 89, and back around a guide pulley 91 journaled on an arm extending from the post 85. By this arrangement the cutters 88—88 can be swung toward and away from the cylinder or core C.

On the end of the shaft 59 which operates the segmental back is arranged a cam 93, engaging which is a roller mounted on a lever 94 pivoted on a stud 95 carried by the frame 57. The lower end of lever 94 connects by link 96 to said swinging bracket 86. These parts are arranged so that when the lever or operating handle 60 is in the position shown in Fig. 2, to close the casting chamber, the swinging bracket 86 is moved to position to hold the cutters 88 away from the core, but so that when said handle is operated to open the casting chamber, the cutters are moved into operative position close to the core or cylinder. By this arrangement, after the casting chamber is opened, and as the cylinder or core is given a half turn to deliver the plate, the riser R is cut off from the plate P by the upper cutter 88; and the lower curved edge of the plate P is trimmed or trued up by the lower cutter 88. To hold the plate accurately on the core or cylinder while this operation takes place, the swinging bracket 86 is provided with an arm 97, in the end of which is journaled a roller 98 which engages the riser R as the cast is turned past the cutters 88—88.

Pivoted spring-pressed pusher-fingers 99 are arranged on the edges of the segmental back, as shown more particularly in Figs. 3ª and 3ᵇ, so that as the chamber is closed for the next cast the same will force or detach both the plate and the riser from the surface of the core.

The notches 56 which are cut in the cylinder or core C are shaped so that when the pushers engage the cast, as shown by arrows in Fig. 9, the same will be easily detached from the core. The holes 560 which are formed at diametrically opposite points on the core or cylinder are arranged to hold the riser R to the core as the pushers act so that the riser will have its lower end pushed clear of the core pivoted about the projection which is formed in the hole 560, as shown more particularly in dotted lines in Fig. 2. This will also insure a separation between the riser and the cast plate, even if the upper cutter or trimmer 88 should not make a clean cut. The riser, from this incline, can be easily taken by the operator at its lower edge and thrown back into the melting-pot. The holes 560 come at diametrically opposite points on the core or cylinder C, so as to come at the center of the inner periphery of each riser.

The plates thus cast and delivered will be trued at their curved ends, and all that is usually necessary to make the same ready for application to the cylinders of the printing press is to true out their inner peripheries, although, of course, the straight edges thereof may be additionally trued up if desired.

The operator manipulating the apparatus generally proceeds as follows:—The pump is cleaned out as described, and the spout thereof is adjusted over the casting apparatus. The matrix is inserted in the apparatus as described. The handle 60 is pulled to the left to bring the back up close to the core, closing the casting chamber and setting the matrix. The handle 25 of the pump is then manipulated until enough metal is poured into the casting chamber to make the cast; then while the plate cools the operator has ample time to put the riser into the melting-pot and to pick up the plate cast at the previous operation, and to put the same in an apparatus for shaving out its inside, or to hand the same to another operator who is to do this. The casting chamber is then opened by sliding back the segmental back by throwing the handle 60 to the right, which simultaneously flexes and strips and removes the matrix from the surface of the cast plate and brings the cutters into operative position. The foot treadle is now depressed and the handle 47 for turning the cylinder is operated so as to deliver the plate and separate the same from the riser and trim its lower edge. When this is done the operator moves the handle 60 again to the left to move the back up to operative position, which restores the matrix to casting shape and closes the casting chamber, which throws out the plate and riser, and proceeds with the next cast.

By this mechanism duplicate curved stereotype printing plates can be cast in a rapid manner.

Although the combinations claimed as this invention are shown as adapted for use in the particular apparatus described, it is to be understood that they can be used in any mechanism wherein they may be advantageously employed. The details of the pumping mechanism are not claimed in this case as the same are claimed in said original application, the claims in this divisional application being directed to the stereotype casting apparatus.

Having thus fully described my invention, what I claim and desire to secure by Letters Patent is:—

1. In a stereotype printing plate casting apparatus, the combination of a core and back, means for turning the core to deliver the plate, and a cutter coöperating with the core to act on the plate as the core is turned.

2. In a stereotype printing plate casting apparatus, the combination of a core and back arranged in vertical position so that the plate will be cast with a riser, means for turning the core on its axis, and a cutter for separating the plate and riser as the core is turned.

3. In a stereotype printing plate casting apparatus, the combination of a core and back arranged in vertical position so that the plate will be cast with a riser, means for turning the core, and cutters coöperating with the core and acting upon the lower end of the plate and between the plate and riser.

4. In a stereotype printing plate casting apparatus, the combination of a core and back arranged in vertical position so that the plate will be cast with a riser, means for turning the core, and cutters coöperating therewith to true the lower end of the plate and to separate the riser from the plate.

5. In a stereotype printing plate casting apparatus, the combination of a core and back, means for separating the core and back, means for turning the core, a cutter coöperating with the core, and means for throwing the cutter into operative position.

6. In a stereotype printing plate casting apparatus, the combination of a core and back, means for opening and closing the casting chamber, means for turning the core, a cutter coöperating with the core, and connections whereby the cutter is thrown into operative position when the core and back are separated.

7. In a stereotype printing plate casting apparatus, the combination of a core and back arranged in vertical position whereby the plate will be cast with a riser, means for moving the back to open and close the casting chamber, means for turning the core, a cutter for separating the plate and riser as the core is turned, and connections for throwing the cutter into operative position.

8. In a stereotype printing plate casting apparatus, the combination of a core and back arranged in vertical position whereby a riser will be cast on the plate, means for rotating the core, a cutter for separating the plate and riser, and a guide engaging the riser as it turns with the core.

9. In a stereotype printing plate casting apparatus, the combination of a core and back arranged in vertical position whereby a riser will be cast on the plate, means for moving the back to open and close the casting chamber, means for rotating the core, a cutter for separating the plate and riser, means for guiding the riser, and means for bringing the cutter and guiding means into operative position when the casting chamber is open.

10. In a stereotype printing plate casting apparatus, the combination of a base-piece, an upright projecting therefrom, a cylinder journaled on said upright, a segmental back coöperating with said cylinder, and means for turning said cylinder on said upright and relatively to the segmental back.

11. In a stereotype printing plate casting apparatus, the combination of a base-piece, an upright secured to the base-piece, a cylinder journaled on the upright, a segmental back coöperating with the cylinder, means for turning the cylinder on the upright and relatively to the segmental back, and means for directing water through said upright against the inner periphery of the cylinder.

12. In a stereotype printing plate casting apparatus, the combination of a base-piece, a hollow upright secured to the base-piece, a cylinder journaled on the upright, a sliding segmental back coöperating with the cylinder, means for turning the cylinder on the upright and relatively to the segmental back, and means for directing water through said upright against the inner periphery of the cylinder.

13. In a stereotype printing plate casting apparatus, the combination of a base, an upright secured to the base, a cylinder journaled on the upright, a segmental back coöperating with the cylinder, means for directing water into the upright, and outlets arranged so that the surface of the cylinder will be cooled opposite the flexible matrix.

14. In a stereotype printing plate casting apparatus, the combination of a base, an upright secured thereto, a core journaled on the upright, a segmental back coöperating with the core, means for directing water up into the upright, and a cylindrical shield surrounding said upright and having orifices for projecting streams of water against the inner side of the core.

15. In a stereotype printing plate casting apparatus, the combination of a base, an upright secured thereto, a cylinder journaled on the upright, a reciprocating segmental back coöperating with the cylinder, and a bracket secured to the top of the upright carrying gearing by which the cylinder can be rotated on the upright and relatively to said segmental back.

16. In a stereotype printing plate casting apparatus, the combination of a core and back, movable matrix clamps carried by the back, and a shield carried by said matrix clamps for preventing metal getting between the matrix and the back.

17. In a stereotype printing plate casting apparatus, the combination of a core and segmental back, movable matrix clamps carried by the back, and a shield carried by said matrix clamps for preventing metal getting between the matrix and the segmental back.

18. In a stereotype printing plate casting apparatus, the combination of a core and segmental back, pivoted matrix clamps carried by the back, and a flexible shield carried by said matrix clamps for preventing metal getting between the matrix and the segmental back.

19. In a stereotype printing plate casting apparatus, the combination of a core and back arranged in vertical position, matrix clamps carried by the back for manipulating the matrix, and a shield carried by said matrix clamps.

20. In a stereotype printing plate casting apparatus, the combination of a core and back arranged in vertical position, movable matrix clamps carried by the back for manipulating the matrix, and a shield carried by said matrix clamps.

21. In a stereotype printing plate casting apparatus, the combination of a core and back arranged in vertical position, movable matrix clamps carried by the back for manipulating the matrix, and a flexible shield carried by said matrix clamps.

22. In a stereotype printing plate casting apparatus, the combination of a core and segmental back arranged in vertical position, pivoted matrix clamps carried by the segmental back for manipulating the matrix, and a flexible shield carried by said matrix clamps.

23. In a stereotype printing plate casting apparatus, the combination of a core and back arranged in vertical position, movable matrix clamps carried by the back for manipulating the matrix, and a shield carried by said clamps and free to slide therein.

24. In a stereotype printing plate casting apparatus, the combination of a core and back arranged in vertical position, movable matrix clamps carried by the back for manipulating the matrix, and a flexible shield carried by said clamps and free to slide therein.

25. In a stereotype printing plate casting apparatus, the combination of a core and back arranged in vertical position, pivoted matrix clamps carried by the back for manipulating the matrix, and a flexible shield carried by said clamps and free to slide therein.

26. In a stereotype printing plate casting apparatus, the combination of a core and back arranged in vertical position, means for moving the back to open and close the casting chamber, means for rotating the core to deliver the plate, ways at the bottom of the core, and means for freeing the plate from the core and moving the same out on the ways.

27. In a stereotype printing plate casting apparatus, the combination of a core and back arranged in vertical position, means for moving the back to open and close the casting chamber, means for rotating the core to deliver the plate, ways at the bottom of the core, and means carried by the back for freeing the plate from the core and moving the same out on the ways.

28. In a stereotype printing plate casting apparatus, the combination of a core and segmental back arranged in vertical position, means for moving the back to open and close the casting chamber, means for rotating the core to deliver the plate, ways at the bottom of the core, and pushers carried by the back for freeing the plate from the core and moving the same out on said ways.

29. In a stereotype printing plate casting apparatus, the combination of a core and back arranged in vertical position so that a riser will be cast on the plate, means for turning the core, means for moving the back to open and close the casting chamber, and means for separating the plate and riser from the core.

30. In a stereotype printing plate casting apparatus, the combination of a core and back arranged in vertical position so that a riser will be cast on the plate, means for moving the back to open and close the casting chamber, means for turning the core, and means carried by the back for separating the plate and riser from the core.

31. In a stereotype printing plate casting apparatus, the combination of a core and segmental back arranged in vertical position so that a riser will be cast on the plate, means for moving the back to open and close the casting chamber, means for turning the core, and pushers carried by the back for separating the plate and riser from the core.

32. In a stereotype printing plate casting apparatus, the combination of a core and back arranged in vertical position so that a riser will be cast on the plate, means for turning the core, means for cutting the plate from the riser, means for freeing the lower edge of the riser from the plate, and means tending to retain the riser on the core.

33. In a stereotype printing plate casting apparatus, the combination of a core and back arranged in vertical position so that a riser will be cast on the plate, means for turning the core, means for cutting the plate from the riser, means for freeing the lower edge of the riser from the plate and means on the core tending to retain the riser on the core.

34. In a stereotype printing plate casting apparatus, the combination of a core and back arranged in vertical position so that a riser will be cast on the plate, means for turning the core, means for cutting the plate from the riser, pushers for freeing the lower edge of the riser from the plate, and a hole in said core which will hold the riser on the core.

35. In a stereotype printing plate casting apparatus, the combination of a cylindrical core and segmental back arranged in vertical position, means for moving the back to open and close the casting chamber, means for imparting a half turn to the cylinder to deliver the plate, a cutter for cutting the riser from the plate as the core is rotated, means on the back for freeing the plate from the core, means for pushing the lower edge of the riser away from the core as the back is moved up to the core for the next cast, and opposed orifices in the cylindrical core to hold each riser to the core after the lower edge thereof is separated from the plate and freed from the cylindrical core.

36. In a machine for making stereotype plates, the combination of a core, a back movable toward and from the core, a cutter for the plates, and connections between the cutter and the back whereby as the back is moved away from the core, the cutter is moved into operative position and as the back is moved toward the core, the cutter is moved out of operative position.

37. In a machine for making stereotype plates, the combination of an upright cylindrical core mounted to rotate, means to rotate the core intermittently, a cutter for the plates, and means to set the core rotating and to throw the cutter into operative position simultaneously.

38. In a machine for making stereotype plates, the combination of an upright cylindrical core mounted to rotate, means to rotate the core intermittently, a back movable toward and from the core, a cutter for the plates, means upon which the cutter is mounted operatively connected with the back so as to throw the cutter into operative position when the back is withdrawn from the core and out of operative position when the back is moved up to the core, and operative connections between the back and the means for rotating the core, whereby when the back is moved away from the core, the core will commence to rotate.

39. In a machine for making stereotype plates, the combination of an upright cylindrical core mounted to rotate, means to rotate the core, a back movable toward and from one side of the core and forming with the core a casting chamber which is substantially semi-cylindrical, means to hold the matrix in said chamber, a cutter for the plates, means upon which the cutter is mounted operatively connected with the back so as to throw the cutter into operative position when the back is withdrawn from the core and out of operative position when the back is moved up to the core, a clutch adapted upon each operation thereof to permit the core to be rotated through substantially 180 degrees, operative connections between the clutch and the back whereby the clutch is operated each time the back is withdrawn from the core, and means for operating the back.

40. In a machine for making stereotype plates, the combination of a cylindrical core, a back movable toward and from the core, means operatively connected with the back to remove a plate from the core as the back moves toward the core, and a platform or support to receive the plate.

41. In a machine for making stereotype plates, the combination of an upright cylindrical core having a transverse groove in its periphery, a back, said core and back forming a casting chamber, and one of said members being capable of movement toward and from the other, a cutter adapted to cut off the plate operating against one side of said groove, and means to rotate the core to deliver a casting from the casting chamber to the cutter.

42. In a machine for making stereotype plates, the combination of a cylindrical core, a back forming with the core a casting chamber, cutting mechanism, and means to rotate the core about an axis through the center of the core in order to deliver the plate from the casting chamber to present the cast plate to the cutters so that its curved edges may be cut.

43. In a machine for making curved stereotype plates, the combination of a cylindrical core, a back forming with the core a casting chamber, means to rotate the core in order to deliver a cast plate from the casting chamber, and means to cut the curved edges of the cast plate during the rotation of the core.

44. In a stereotype printing plate casting apparatus, the combination of a vertically disposed back, and a vertically disposed core having a plurality of casting faces each adapted to be brought into operative relation with the back.

45. In a stereotype printing plate casting apparatus, the combination of a vertically disposed back, and a vertically disposed core having a plurality of casting faces each adapted to be brought into operative relation with the back, with means for separating the core and back.

46. In a stereotype printing plate casting apparatus, the combination of a vertically disposed segmental back, and a vertically disposed core having a plurality of casting faces, so arranged as to constitute a casting chamber which may be charged at one of its curved ends.

47. In a stereotype printing plate casting apparatus, the combination of a vertically disposed segmental back, and a vertically disposed core having a plurality of casting faces, so arranged as to constitute a casting chamber which may be charged at one of its curved ends, with means for separating the core and back in order that the casting may be discharged.

48. In a stereotype printing plate casting apparatus, the combination of a vertically disposed segmental back, and a vertically disposed core having a plurality of casting faces, so arranged as to constitute a casting chamber which may be charged at one of its curved ends, with means for retaining the cast in vertical position in contact with the core when the chamber is open.

49. In a stereotype printing plate casting apparatus, the combination of a segmental back, and a core so arranged as to constitute a casting chamber which may be charged at one of its curved ends, with means for separating the core and back and means for discharging the cast in a direction at right angles to that in which it was poured.

50. In a stereotype printing plate casting apparatus, the combination of a segmental back, and a core having a plurality of casting faces, so arranged as to constitute a casting chamber which may be charged at one of its curved ends, with means for separating the core and back and means for discharging a cast in a direction at right angles to that in which it was poured.

51. In a stereotype printing plate casting apparatus, the combination of a segmental back, and a rotatable core so arranged as to constitute a casting chamber which may be charged at one of its curved ends, with means for separating the core and back and means for discharging the cast in a direction at right angles to that in which it was poured.

52. In a stereotype printing plate casting apparatus, the combination of a segmental back, and a rotatable core having a plurality of casting faces, so arranged as to constitute a casting chamber which may be charged at one of its curved ends, with means for separating the core and back and means for discharging the cast in a direction at right angles to that in which it was poured.

53. In a stereotype printing plate casting apparatus, the combination of a vertically disposed segmental back, and a vertically disposed core, so arranged as to constitute a casting chamber which may be charged at one of its curved ends, with means for separating the core and back and means for discharging the cast in a direction at right angles to that in which it was poured.

54. In a stereotype printing plate casting apparatus, the combination of a vertically disposed segmental back, and a vertically disposed rotatable core having a plurality of casting faces, so arranged as to constitute a casting chamber which may be charged at one of its curved ends, with means for separating the core and back and means for discharging the cast in a direction at right angles to that in which it was poured.

55. In a stereotype printing plate casting apparatus, the combination of a back and core so arranged as to constitute a casting chamber, means for charging the casting chamber in a direction parallel to the axis thereof, and means for discharging the resulting cast at right angles to the direction of charging.

56. In a stereotype printing plate casting apparatus, the combination of a core and back so arranged as to constitute a casting chamber, means for holding the matrix in position therein, means for shielding the upper curved end of the matrix so that the incoming metal shall not run behind it, with means for separating the said shielding means from the cast.

57. In a stereotype printing plate casting apparatus, the combination of a core and back so arranged as to constitute a casting chamber, means for holding the matrix in position therein, means for shielding the upper curved end of the matrix so that the incoming metal shall not pass behind it, with means for re-positioning the said shielding means after each succeeding cast.

58. In a stereotype printing plate casting apparatus, the combination of a core and back so arranged as to constitute a casting chamber, means for holding the matrix in position therein, means for shielding the upper curved end of the matrix so that incoming metal shell not run behind it, with means for separating the said shielding means from the cast and for thereafter re-positioning it for the next succeeding cast.

59. In a stereotype printing plate casting apparatus, the combination of a vertically disposed core, and a vertically disposed back, so arranged as to constitute a casting chamber, with means for holding the matrix in position therein, means for shielding the upper curved end of the matrix so that incoming metal shall not run behind it, and means for separating the said shielding means from the cast.

60. In a stereotype printing plate casting apparatus, the combination of a vertically disposed core, and a vertically disposed back, so arranged as to constitute a casting chamber, with means for holding the matrix in position therein, means for shielding the upper curved end of the matrix so that incoming metal shall not run behind it, and means for re-positioning the said shielding means after each succeeding cast.

61. In a stereotype printing plate casting apparatus, the combination of a vertically disposed core, and a vertically disposed back, so arranged as to constitute a casting chamber, with means for holding the matrix in position therein, means for shielding the upper curved end of the matrix so that the incoming metal cannot run behind it, means for separating said shielding means from the cast and for thereafter re-positioning it for the next succeeding cast.

62. In a stereotype printing plate casting apparatus, the combination of a vertically disposed core, and a vertically disposed back, so arranged as to constitute a casting chamber, with means for holding the matrix in position therein, means for separating the matrix from the cast plate, means for shielding the upper curved end of the matrix so that the incoming metal shall not run behind it and means for separating the said shielding means from the cast.

63. In a stereotype printing plate casting apparatus, the combination of a vertically disposed core, and a vertically disposed back, so arranged as to constitute a casting chamber, with means for holding the matrix in position therein, means for separating the matrix from the cast plate, means for shielding the upper curved end of the matrix so that incoming metal cannot run behind it, and means for re-positioning the said shielding means after each succeeding cast.

64. In a stereotype printing plate casting apparatus, the combination of a vertically disposed core and a vertically disposed back, so arranged as to constitute a casting chamber, with means for holding the matrix in position therein, means for separating the matrix from the cast plate, means for shielding the upper curved end of the matrix so that the incoming metal shall not run behind it, means for separating said shielding means from the cast and for thereafter re-positioning it for the next succeeding cast.

65. In a stereotype printing plate casting apparatus, the combination of a vertically disposed core, and a vertically disposed back, so arranged as to constitute a casting chamber, with means for holding the matrix in position therein, means for re-positioning the matrix after each cast, means for shielding the upper curved end of the matrix so that incoming metal shall not run behind it and means for separating the said shielding means from the cast.

66. In a stereotype printing plate casting apparatus, the combination of a vertically disposed core, and a vertically disposed back, so arranged as to constitute a casting chamber, with means for holding the matrix in position therein, means for re-positioning the matrix after each cast, means for shielding the upper curved end of the matrix so that incoming metal shall not run behind it, and means for re-positioning the said shielding means after each succeeding cast.

67. In a stereotype printing plate casting apparatus, the combination of a vertically disposed core, and a vertically disposed back, so arranged as to constitute a casting chamber, with means for holding the matrix in position therein, means for re-positioning the matrix after each cast, means for shielding the upper curved end of the matrix so that the incoming metal shall not run behind it, means for separating said shielding means from the cast and for thereafter re-positioning it for the next succeeding cast.

68. In a stereotype printing plate casting apparatus, the combination of a vertically disposed core, and a vertically disposed back, so arranged as to constitute a casting chamber, with means for holding the matrix in position therein, means for separating the matrix from the cast plate and for re-positioning the matrix after each cast, means for shielding the upper curved end of the matrix so that incoming metal shall not run behind it, and means for separating the said shielding means from the cast.

69. In a stereotype printing plate casting apparatus, the combination of a vertically disposed core and a vertically disposed back, so arranged as to constitute a casting chamber, with means for holding the matrix in position therein, means for separating the matrix from the cast plate and for re-positioning the matrix after each cast, means for shielding the upper curved end of the matrix so that incoming metal shall not run behind it, and means for re-positioning the said shielding means after each succeeding cast.

70. In a stereotype printing plate casting apparatus, the combination of a vertically disposed core, and a vertically disposed back, so arranged as to constitute a casting chamber, with means for holding the matrix in position therein, means for separating the matrix from the cast plate and for re-positioning the matrix after each cast, means for shielding the upper curved end of the matrix so that the incoming metal shall not run behind it, means for separating said shielding means from the cast and for thereafter re-positioning it for the next succeeding cast.

71. In a stereotype printing plate casting apparatus, the combination of a vertically disposed core and back, so arranged as to cast a plate with a riser thereon, means for charging the said apparatus from one of its curved ends, and means for discharging the cast plate and riser.

72. In a stereotype printing plate casting apparatus, the combination of a vertically disposed core and back so arranged as to cast a plate with a riser thereon, means for charging the said apparatus from one of its curved ends, and means for discharging the cast plate and riser in a direction at right angles to that of its charging.

73. In a stereotype printing plate casting apparatus comprising a vertically disposed core and segmental back, means for charging the said apparatus from one of its curved ends, and means for discharging the cast plate in a horizontal direction with one of its curved ends lowermost.

74. In a stereotype printing plate casting apparatus comprising a vertically disposed core and segmental back, means for charging the said apparatus from one of its curved ends, and means for discharging the cast plate in such a direction that it shall rest when discharged upon one of its curved ends.

75. In a stereotype printing plate casting apparatus comprising a vertically disposed core and segmental back, means for charging the said apparatus from one of its curved ends, means for discharging the cast plate in such a direction that it shall rest when discharged upon one of its curved ends, and means for receiving the said plate.

76. In a stereotype printing plate casting apparatus comprising a back, and a core having a plurality of casting faces, means for charging the said apparatus from one of its curved ends, and means for shielding the upper curved edge of the matrix so that incoming metal shall not run behind it.

77. In a stereotype printing plate casting apparatus comprising a back, and a core having a plurality of casting faces, means for charging the said apparatus from one of its curved ends, means for shielding the upper curved edge of the matrix so that incoming metal shall not run behind it, and means for separating the shielding means from the cast.

78. In a stereotype printing plate casting apparatus comprising a back, and a core having a plurality of casting faces, means for charging the said apparatus from one of its curved ends, means for shielding the upper curved edge of the matrix so that incoming metal shall not run behind it, and means for re-positioning the shielding means after each succeeding cast.

79. In a stereotype printing plate casting apparatus comprising a back, and a core having a plurality of casting faces, means for charging the said apparatus from one of its curved ends, means for shielding the upper curved edge of the matrix so that incoming metal shall not run behind it, means for separating the shielding means from the cast and for thereafter re-positioning it after each succeeding cast.

80. In a stereotype printing plate casting apparatus consisting of a core and back, means for charging said apparatus from one of its curved ends so as to make a printing plate with a riser thereon, and means for securing the riser to the core.

81. In a stereotype printing plate casting apparatus, the combination of a core and segmental back, means for moving the back to open and close the casting chamber, means for turning the core, a cutter coöperating with the core, and connections whereby the cutter is thrown into operative position when the segmental back is moved to open the casting chamber.

In testimony whereof I have hereunto set my hand, in the presence of two subscribing witnesses.

H. A. WISE WOOD.

Witnesses:
W. H. STETSON,
ANNIE B. WALTERS.